May 6, 1924.

L. M. WOOLSON

MOTOR VEHICLE

Filed April 26, 1920

1,493,311

Inventor
Lionel M. Woolson

By [signature], Atty.

Patented May 6, 1924.

1,493,311

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed April 26, 1920. Serial No. 376,533.

*To all whom it may concern:*

Be it known that I, LIONEL M. WOOLSON, a citizen of the United States, and resident of Detroit, Wayne County, State of Michigan, have invented certain new and useful Improvements in Motor Vehicles, of which the following is a specification.

This invention relates to motor vehicles, and more particularly to steering knuckle mechanism therefor.

The invention has for its object to provide a construction of steering knuckle mechanism that may be easily operated and will be sensitive in operation to slight changes in pressure exerted thereon.

Another object of the invention is to provide a construction having improved wearing qualities whereby the mechanism will be adapted for use over extended periods of time without replacing the operative parts thereof.

Another object of the invention is to provide a construction having means for taking up wear on the bearing parts that sustain the load or the weight of the vehicle.

Another object of the invention is to provide steering knuckle mechanism that may be easily and quickly assembled and taken apart.

Further objects will appear from the specification and from the drawings which form a part thereof, and in which the steering knuckle mechanism is illustrated in elevation, parts of the structure being broken away to show the details of the construction.

In the embodiment of the invention illustrated, the steering knuckle member comprises a spindle 10, which is supported in the usual manner upon a wheel 11, and a pair of members 12 and 13, which are preferably formed integral with the spindle 10. The members 12 and 13 are vertically spaced apart and are provided with aligned bearing portions 14, the upper bearing portion receiving a flanged bushing 15 and the lower bearing portion receiving a flanged bushing 16. The steering knuckle members 12 and 13 are split and are provided with laterally extending ears 16' which are adapted to be drawn together, after the bushings 15 and 16 have been inserted, by means of nuts 17', these nuts being threaded onto the free ends of a steering knuckle lever 18 and a steering knuckle arm 19. A steering knuckle pin 17 is provided with an upper cylindrical portion 20, a lower cylindrical portion 21, and an intermediate tapered portion 22, and this latter portion is seated in a correspondingly tapered portion 23 of an axle 24. The cylindrical portion 20 of the steering knuckle pin is received by the bushing 15, and the cylindrical portion 21 is disposed within a sleeve 25, which, in turn, is positioned within the flanged bushing 16.

In order to transmit the weight of the axle to the steering knuckle, a washer 26 is interposed between the upper end of the sleeve 25 and the lower end of the portion 23 of the axle, and a washer 27 is positioned between the lower end of the sleeve 25 and a nut 28, the latter being threaded onto the lower end 29 of the steering knuckle pin 17. By drawing up the nut 28 the pin 17 is secured in the end of the axle. The lower end 29 of the pin 17 is provided with a spherical bearing surface 30, this surface seating on a ball 31, which in turn is seated on its diametrically opposite side in a spherical bearing surface 32 formed on the upper end of an adjustable bearing member 33, the latter being screw threaded into the lower end of a cap 34. The cap 34, as illustrated in the drawings, is provided at its upper end, as shown at 35, with a series of screw threads which engage corresponding screw threads formed on the lower end of the flanged bushing 16. A lock nut 36 engages the threads on the adjustable bearing member 33 and locks this member in any desired position of adjustment. In order to prevent accidental turning of the cap 34, the upper outer surface of this cap is provided with a plurality of notches 37 and the member 13 of the steering knuckle has a notch 37' which notches are adapted to receive the upper end of a locking dog 38, the lower end of this dog being clamped between the nut 36 and the lower end of the cap 34 and being provided with an aperture through which the bearing member 33 extends.

The steering knuckle arm 19 is connected at its outer end to one end of a steering cross tube 39 of usual construction, it being understood that the opposite end of this tube is connected to a corresponding steering knuckle arm at the opposite side of the vehicle.

In order to lubricate the ball bearing 31, the steering knuckle pin 17 is provided with a longitudinal opening 40 which extends throughout the length of the tube and conducts lubricant from a recess 41 formed in a cap 42 secured to the upper steering knuckle member 12, a grease cup (not shown) being carried by this cap and furnishing lubricant which will pass onwardly through the opening 40 and be distributed thereby to the ball bearing 31.

From the above description it will be seen that the weight of the vehicle transmitted through the axle will be carried by the ball bearing 31, this weight being communicated through the washer 26, sleeve 25, washer 27, nut 28, and bearing 30 to the ball 31, and through the ball 31 to the bearing member 33, cap 34, and bushing 16, the flange on this bushing being supported on the knuckle member 13 and thus communicating the load to the spindle and supporting wheel.

By reason of the ball bearing and of the means for lubricating this bearing, the weight of the vehicle will be supported in an efficient and practical manner, and it will at once be clear that the steering knuckle described may be much more easily operated than the steering knuckles of ordinary construction.

It will also be evident that the device described may be easily and quickly assembled and taken apart, but in view of the detailed description in the specification of the structure, a specific description of the method of assembling and taking apart the device is not deemed necessary.

While I have in the above specification described one specific embodiment of my invention, it will be understood that the invention is capable of modification and that changes in the construction and arrangement of the various parts may be made without departing from the spirit or scope of the invention as expressed in the following claims.

Having thus described my invention, what I claim and desire to secure by Letters Patent is:

1. A steering knuckle comprising in combination a knuckle member, a bushing carried thereby and having a flange seated thereon, a cap secured to said bushing, a pin positioned in said bushing and having a spherical bearing surface, a bearing member carried by said cap and provided with a spherical bearing surface, and a ball positioned between said spherical bearing surfaces.

2. A steering knuckle comprising in combination a knuckle member, a bushing carried thereby and having a flange seated thereon, a cap adjustably secured to said bushing, a pin positioned in said bushing and having a spherical bearing surface, a bearing member adjustably carried by said cap and having a spherical bearing surface, and a ball positioned between said spherical bearing surfaces.

3. In a motor vehicle, the combination with an axle and a wheel, of a knuckle pin secured to the axle, a knuckle member having a spindle mounted in the wheel and having a bearing for said pin, a hollow member detachably secured to said knuckle member, and a ball thrust bearing between said pin and said hollow member.

4. In a steering knuckle for motor vehicles, the combination with the knuckle pin and the knuckle member, of a sleeve in said knuckle member, a bearing for said pin in said sleeve, a hollow member threaded to said sleeve, and a thrust bearing between the end of said pin and said hollow member.

5. In a steering knuckle for motor vehicles, the combination with the knuckle pin and the knuckle member, of a sleeve in said knuckle member, a bearing for said pin in said sleeve, a hollow member threaded to said sleeve, and a ball thrust bearing in said hollow member adjustably arranged at the end of said pin.

6. In a steering knuckle, the combination with a knuckle pin and a knuckle member of a sleeve mounted in said knuckle member and having a flange resting thereon, a cap threaded on said sleeve at the end opposite said flange, said cap securing said sleeve to said knuckle member, a bearing for said knuckle pin in said sleeve, and a thrust bearing for said knuckle pin in said cap.

7. In a steering knuckle joint, the combination with a knuckle pin and a knuckle member, of a cap detachably secured to said knuckle member, said pin having a bearing in said knuckle member and having its end extending into said cap, and an adjustable bearing block in said cap, and a ball between said bearing block and the end of said pin.

In testimony whereof I affix my signature.

LIONEL M. WOOLSON.